(12) United States Patent
Jonak et al.

(10) Patent No.: US 12,361,146 B1
(45) Date of Patent: Jul. 15, 2025

(54) HARDWARE-AGNOSTIC IOT SECURITY

(71) Applicant: United Services Automobile Association (USAA), San Antonio, TX (US)

(72) Inventors: Sumita T. Jonak, San Antonio, TX (US); Thomas Bret Buckingham, Fair Oaks Ranch, TX (US); Darrius M. Jones, San Antonio, TX (US); Dustin Starr Trimmier, San Antonio, TX (US); Soon Fatt Hoo, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 443 days.

(21) Appl. No.: 16/413,254

(22) Filed: May 15, 2019

Related U.S. Application Data

(60) Provisional application No. 62/671,556, filed on May 15, 2018.

(51) Int. Cl.
*H04L 29/06* (2006.01)
*G06F 21/62* (2013.01)
*H04W 12/30* (2021.01)

(52) U.S. Cl.
CPC ............ *G06F 21/62* (2013.01); *H04W 12/30* (2021.01)

(58) Field of Classification Search
CPC ....... G06F 21/62; H04W 12/30; H04W 12/08; H04W 23/08; H04W 4/00; H04W 4/005; H04W 4/021; H04W 12/61; H04W 12/63; H04L 67/18; H04L 63/0263; H04L 63/107; H04L 63/108
See application file for complete search history.

(56) References Cited

U.S. PATENT DOCUMENTS

| | | | | |
|---|---|---|---|---|
| 9,781,602 | B1* | 10/2017 | Girdhar | H04W 4/021 |
| 2016/0182452 | A1* | 6/2016 | Entezari | H04L 63/107 |
| | | | | 726/13 |
| 2017/0093915 | A1* | 3/2017 | Ellis | H04W 12/08 |
| 2017/0195318 | A1* | 7/2017 | Liu | H04L 67/2809 |
| 2017/0280279 | A1* | 9/2017 | Ghosh | H04L 67/24 |
| 2018/0219920 | A1* | 8/2018 | Patel | H04L 63/10 |

\* cited by examiner

*Primary Examiner* — Joseph P Hirl
*Assistant Examiner* — Chi D Nguy
(74) *Attorney, Agent, or Firm* — Fish & Richardson P.C.

(57) ABSTRACT

Methods, systems, and apparatus, including computer programs encoded on a computer storage medium, for receiving location data representative of a location of a mobile device of a user. Determining that a scenario is occurring within an Internet-of-Things (IoT) system at least partially based on the location data, In response, implementing a security/privacy measure to prohibit at least a portion of data transfer from at least one IoT device of the IoT system to an external network.

20 Claims, 4 Drawing Sheets

HARDWARE-AGNOSTIC IOT SECURITY

CROSS-REFERENCE TO RELATED APPLICATION

This application claims priority under 35 U.S.C. § 119 to U.S. Application Ser. No. 62/671,556, filed on May 15, 2018, and entitled "Hardware-Agnostic IoT Security," the entire contents of which is incorporated by reference herein.

BACKGROUND

There has been a dramatic increase in the number of appliances, devices, utility devices, mechanisms, lighting fixtures, security devices, and/or other types of devices that are available for the home or other environments. Such devices can include data collection, computing, sensing, and/or network communication capabilities in addition to their normal functionality. These devices may be described as smart appliances, smart vehicles, smart building components, smart infrastructure components, and the like, and may also be described as Internet of Things (IoT) devices. The various devices may generate data, such as sensor data and status information, and the data may be shared among the devices over one or more wired and/or wireless networks. In some instances, the devices may be sensed and controlled remotely over network(s), and the data generated by the devices may be collected, analyzed, or otherwise processed by computing devices, analytic cloud based IoT platforms, and/or individuals.

Such devices, and IoT networks provide vectors for data acquisition that may be unacceptable to users. Further, users should have granular control over their data, movement of the data, and data privacy. For example, a user might not want a provider of IoT services to have access to certain data, and/or malicious users (e.g., hackers) to be able to access the data. In one example, IoT devices that are responsive to speech (e.g., voice-enabled assistants) may collect voice data that is irrelevant to functionality provided by the IoT device. For example, a person may be discussing happenings at their place of employment in proximity to the IoT device, which speech is at least partially captured by the IoT device. This speech may be irrelevant to functionality of the IoT device, or otherwise may include content that the person does not want distributed through the IoT infrastructure.

SUMMARY

Implementations of the present disclosure are generally directed to data security, and data privacy in Internet of Things (IoT) infrastructures. More particularly, implementations of the present disclosure are directed to hardware-agnostic data security in IoT systems that enables users to have more granular control over data. In some implementations, actions include receiving location data representative of a location of a mobile device of a user, determining that a scenario is occurring within an Internet-of-Things (IoT) system at least partially based on the location data, and in response, implementing a security/privacy measure to prohibit at least a portion of data transfer from at least one IoT device of the IoT system to an external network. Other implementations include corresponding systems, apparatus, and computer programs, configured to perform the actions of the methods, encoded on computer storage devices.

These and other implementations can each optionally include one or more of the following innovative aspects: occurrence of the scenario is further determined at least partially based on a unique authenticator of the mobile device; the unique identifier includes two or more of the location of the device, a timestamp, a service set identifier (SSID) of a network the IoT system uses to communicate, and an application identifier; prohibiting at least a portion of data transfer from at least one IoT device includes receiving or sending a data packet, determining that the data packet is associated with the at least one IoT device, and preventing transfer of the data packet to/from an external network; determining that the data packet is associated with the at least one IoT device includes determining that the data packet is associated with a unique identifier, the unique identifier being assigned to the at least one IoT device; a gatekeeper of the IoT system implements the security/privacy measure; and the gatekeeper includes one or more of a router, and an access point.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
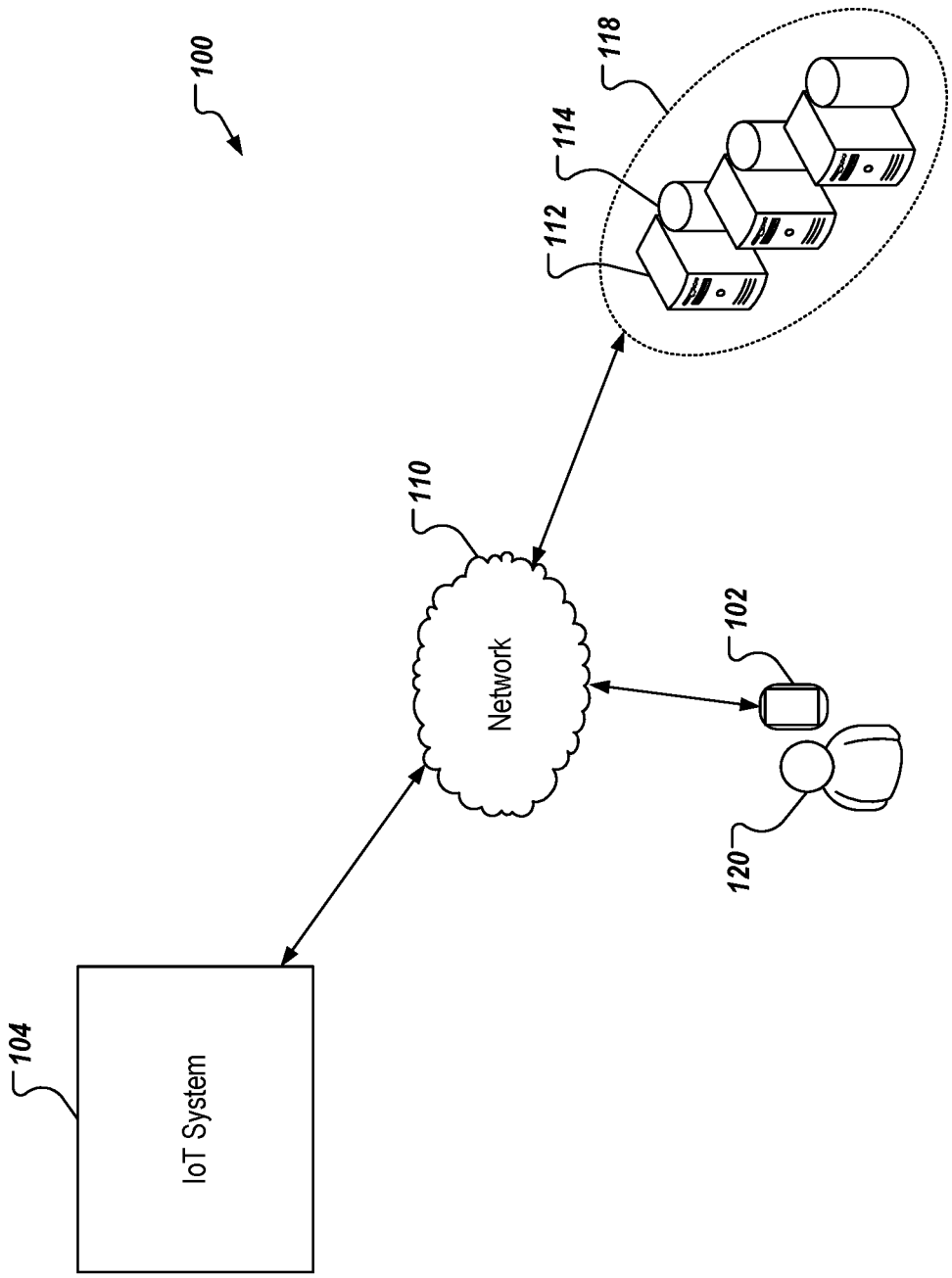
FIG. 1 depicts an example high-level architecture in accordance with implementations of the present disclosure.

Implementations of the present disclosure are generally directed to data security, and data privacy in Internet of Things (IoT) infrastructures. More particularly, implementations of the present disclosure are directed to hardware-agnostic data security in IoT systems. In some implementations, actions include receiving location data representative of a location of a mobile device of a user, determining that a scenario is occurring within an Internet-of-Things (IoT) system at least partially based on the location data, and in response, implementing a security/ privacy measure to prohibit at least a portion of data transfer from at least one IoT device of the IoT system to an external network.

As introduced above, IoT infrastructures provide one or more vectors for data acquisition that may be unacceptable to a user. For example, an IoT system can include one or more IoT devices that acquire data responsive to an environment, within which the IoT devices are located. Example IoT devices include, without limitation, smart appliances (e.g., washers, dryers, refrigerators, ovens, dishwashers), home entertainment systems (e.g., televisions, audio systems, game consoles, media players, etc.), in-home control systems (e.g., electrical switches/outlets, garage door openers, alarm systems, security systems, smart home systems), lighting devices (e.g., lamps, fixtures, etc.), utility systems that provide and/or control electric power, gas, water, sewage, heating and air conditioning, network access, and so forth, (e.g., water meters, water heaters, gas meters, electrical switch boxes, circuit breaker boxes, etc.), portable or less portable computing devices (e.g., smartphones, tablet computers, electronic book readers, gaming systems, laptop computers, desktop computers, television set-top boxes, in-vehicle automotive computers or telematics devices, infotainment systems, etc.), voice-enabled assistants (e.g., Amazon Alexa through the Amazon Echo), interior/exterior cameras, and consumer products including sensors that indicate consumption/use of the product (e.g., health drinks with IoT beacons).

As also introduced above, vectors for data acquisition through an IoT system may be unacceptable to users. For example, a user might not want a provider of IoT services to have access to certain data, and/or malicious users (e.g., hackers) to be able to access the data. In one example, IoT devices that are responsive to speech (e.g., voice-enabled assistants) may collect voice data that is irrelevant to functionality provided by the functionality of the IoT device. For example, a person may be discussing happenings at their place of employment in proximity to the IoT device, and that speech is at least partially captured by the IoT device. This speech may be irrelevant to functionality of the IoT device, or otherwise may include content that the person does not want distributed through the IoT system.

Providers of IoT devices can implement security/privacy measures for their respective devices. For example, providers can implement data encryption for communicating data from the devices they provide. However, security/privacy measures can be provider-specific, and/or hardware-specific. Consequently, disparate security/privacy measures can exist within an IoT system, and the user may be required to understand, and interact with each IoT device, individually to provide a level of security the user finds acceptable. This can be technologically impractical (e.g., an IoT device alone, or in combination with other IoT devices not able to provide the security required by the user) with provider-, and/or hardware-specific security. Further, available data security, and/or privacy measures may not enable a user to prevent data acquisition, and/or transmission by IoT devices without disabling the IoT devices, and/or disconnecting the IoT devices from a network to maintain user privacy.

In view of this, implementations of the present disclosure provide hardware-agnostic data security in IoT systems. More particularly, and as described in further detail herein, implementations of the present disclosure enable users to provide one or more security criteria representative of one or more scenarios within an IoT system. Implementations further enable users to define security/privacy measures that can be taken in response to occurrence of one or more of the scenarios. In some examples, security/privacy measures can be specific to a scenario. For example, it can determine whether a scenario is occurring (e.g., all criteria for the scenario are present), and in response, implement security/privacy measures for the scenario.

Accordingly, and as described in further detail herein, implementations of the present disclosure provide a software-based platform for implementing user-defined security in an IoT system. In some examples, the platform can be referred to as a dynamic data security platform. As described herein, the dynamic data security platform enables data security/privacy measures to be implemented regardless of the particularities of the specific IoT devices. In other words, the software-based platform enables hardware-agnostic, user-defined data security. Among other advantages, described herein, implementations of the present disclosure reduce the barrier to entry for users to establish tailored data security in IoT systems, and do not require specific hardware (e.g., security-specific routers/appliances) to implement. Further, security/privacy measures of the present disclosure avoid the need to disable IoT devices, and/or disconnect IoT devices from a network.

Implementations of the present disclosure are described in further detail herein with reference to an example IoT system. The example IoT system includes a home-based IoT system at a residence of a user. It is contemplated, however, that implementations of the present disclosure can be realized in any appropriate IoT system.

FIG. 1 depicts an example high-level architecture 100 in accordance with implementations of the present disclosure. The example architecture 100 includes a device 102, a back-end system 118, and a network 110. In some examples, the network 110 includes a local area network (LAN), wide area network (WAN), the Internet, a cellular telephone network (e.g., CDMA, 4G, 5G, GSM), a public switched telephone network (PSTN), a private branch exchange (PBX), or any appropriate combination thereof, and connects web sites, devices (e.g., the device 102), and back-end systems (e.g., the back-end system 118). In some examples, the network 110 can be accessed over a wired, and/or a wireless communications link. For example, mobile devices, such as smartphones can utilize a cellular network to access the network 110.

In the depicted example, the back-end system 118 includes at least one server system 112, and data store 114 (e.g., database). In some examples, one or more of the back-end systems host one or more computer-implemented services that users can interact with using computing devices. For example, the back-end system 118 can host at least a portion of a voice-enabled assistant that receives data from the IoT system 104 (e.g., speech data), processes the data, and provides one or more responses. As another example, the back-end system 118 can host a home monitoring system that receives data from the IoT system 104 (e.g., video data) to perform one or more functions (e.g., home security/monitoring) based on the data.

In some implementations, the device 102 can include any appropriate type of computing device such as a desktop computer, a laptop computer, a handheld computer, a tablet computer, a personal digital assistant (PDA), a cellular telephone, a network appliance, a camera, a smartphone, a telephone, a mobile phone, a media player, a navigation device, an email device, a game console, or an appropriate combination of any two or more of these devices, or other data processing devices. In the depicted example, the device 102 is provided as a mobile device (e.g., smartphone).

In some implementations, the device 102 is used by a user 120 to interact with the dynamic data security platform of the present disclosure. In accordance with the present disclosure, the user 120 uses the device 102 to interact with the back-end system 118. In some examples, the device 102 includes an application executed thereon (e.g., a mobile application ("mobile app")) that provides one or more graphical user interfaces (GUIs), through which the user 120 can interact with the dynamic security platform. In some examples, the device 102 includes a web browser application executed thereon that displays one or more web pages, through which the user 120 can interact with the dynamic data security platform.

In accordance with implementations of the present disclosure, the dynamic data security platform enables a user (e.g., the user 120) to define one or more scenarios within an IoT system (e.g., the IoT system 104). Implementations further enable users to define security/privacy measures that can be taken in response to occurrence of one or more of the scenarios. In some examples, security/privacy measures can be specific to a scenario. For example, it can determine whether a scenario is occurring (e.g., all criteria for the scenario are present), and in response, implement security/privacy measures for the scenario.

In some implementations, the dynamic data security platform includes a binary file (e.g., .EXE file, .DLL file) that can be installed within an IoT system (e.g., the IoT system 104), and enables users to define scenarios, and security/privacy measures responsive to an occurrence of a scenario. In some examples, the user can interface with the dynamic data security platform through one or more GUIs. For example, the user can operate a device (e.g., the device 102), which includes a mobile app installed thereon. The mobile app can enable interaction with the IoT system over a network (e.g., the network 110).

In some implementations, a unique authenticator can be provided for the device within the IoT system. In some examples, the unique authenticator is based on two or more of a location of the device, a timestamp, a service set identifier (SSID) of the network the IoT system uses to communicate (e.g., a wireless LAN), the device's IP and/or MAC address, and an application identifier (e.g., unique identifier assigned to the mobile app executing on the device). Accordingly, the unique authenticator is dynamic in that, for a given network, and mobile app, the unique identifier can change based on time (e.g., as timestamp changes), and/or location (e.g., as the device moves within a location).

In some implementations, the user can define each scenario based on one or more criteria. Example criteria include, without limitation, unique authenticator, presence of a device at a location, time of day, day of week, and the like. For example, the user may work from home, and can define a scenario (work scenario) based on criteria representative of working from home (e.g., 9 AM to 5 PM, weekdays, device located in home office). Accordingly, if the user's device is determined to be located in or near a home office of the user, the work scenario is determined to be occurring, and respective security/privacy measures can be implemented.

Implementations of the present disclosure enable the user to define multiple scenarios that can include relatively simple scenarios to relatively complex scenarios. A non-limiting, relatively simple scenario can include a home scenario, which can be defined by a single criterion (e.g., whether the device is located at the home of the user). This criterion can be determined, for example, based on one or more of location data (e.g., global positioning system (GPS) coordinates of the device), and network data (e.g., the SSID of the network that the device is connected to). A non-limiting, relatively complex scenario can include a home office scenario, which can be defined by multiple criteria (e.g., whether the device is located within an office within a residence of the user (home office), whether a current time is within defined work hours (between 9 AM and 5 PM), and whether the current day is a defined work day). These criteria can be determined, for example, based on one or more location data (e.g., global positioning system (GPS) coordinates of the device), network data (e.g., the SSID of the network that the device is connected to), and IoT device data (e.g., IoT devices in the residence communicating with the user's device).

For each scenario, implementations of the present disclosure enable the user to define one or more security/privacy measures that can include relatively simple security/privacy measures to relatively complex security/privacy measures. A non-limiting, relatively simple security/privacy measure includes preventing transmission of all data packets from the IoT system. That is, for example, all data packets from any IoT device within the IoT system are blocked (dropped) from transmission to any external network (e.g., the network 110). A non-limiting, relatively complex security/privacy measure includes preventing transmission of a specific type of data packet from one or more specific IoT devices within the IoT system. For example, for a given scenario, particular types of data packets (e.g., data packets including speech data) from one or more IoT devices (e.g., voice-enabled assistant located in a home office) are blocked, while other types of data packets (e.g., data packets including video data) from one or more other IoT devices (e.g., exterior cameras) are allowed.

In some implementations, blocking of the data packets occurs at one or more of a router, an access point, a cloud server, and a proxy server. In some examples, the router, access point, cloud server, and proxy server can each be described as a gatekeeper in the context of the present disclosure. In some implementations, at least a portion of the dynamic data security platform is installed on, and executed by one or more gatekeepers (e.g., as binary file(s)). As described herein, in response to occurrence of a scenario, a gatekeeper can execute one or more security/privacy measures for the scenario. In some implementations, some or all of the data traffic from IoT devices in an IoT system can be routed through a proxy server or a cloud-based filtering service. The proxy or cloud-based service can act as the gatekeeper to block data packets in accordance with user defined or system default data blocking settings.

In some implementations, a security/privacy measure includes blocking all packets to and/or from one or more IoT devices. In some examples, an IoT device is associated with a unique identifier. Example unique identifiers for IoT devices can include, without limitation, a media access control (MAC) address, an Internet Protocol (IP) address, and a combination of a MAC address, and IP address. In some examples, a data packet can include the unique identifier. In this manner, for example, the dynamic data security platform can distinguish data packets as between IoT devices, and selectively block data packets. That is, for example, if a data packet includes the unique identifier of a to-be-blocked IoT device, the data packet is blocked from transmission to an external network (e.g., the network 110). As another example, if a data packet does not include the unique identifier of a to-be-blocked IoT device, the data packet is transmitted to the external network (e.g., the network 110). As another example, if a data packet is received from an external network (e.g., an inbound data packet), and includes the unique identifier of a to-be-blocked IoT device, the data packet is blocked from transmission to the IoT device within the IoT system. As another example, if an inbound data packet does not include the unique identifier of a to-be-blocked IoT device, the data packet is transmitted to the IoT device within the IT system.

In some implementations, a security/privacy measure includes blocking all packets directed to, and/or received from a particular destination. An example destination can include, without limitation, a server. In some examples, a unique identifier is associated with a destination. Example unique identifiers for destinations can include, without limitation, a MAC address, an IP address, and a combination of a MAC address, and IP address. In this manner, for example, the dynamic data security platform can distinguish data packets as between destinations, and selectively block data packets. That is, for example, if a data packet includes the unique identifier of a to-be-blocked destination, the data packet is blocked from transmission to an external network (e.g., the network 110). As another example, if a data packet does not include the unique identifier of a to-be-blocked destination, the data packet is transmitted to the external network (e.g., the network 110). As another example, if a data packet is received from an external network (e.g., an inbound data packet), and includes the unique identifier of a to-be-blocked destination, the data packet is blocked from transmission to the IoT device within the IoT system. As another example, if an inbound data packet does not include the unique identifier of a to-be-blocked destination, the data packet is transmitted to the IoT device within the IoT system.

In some implementations, a security/privacy measure includes blocking data packets having particular types of data. Example types of data can include, without limitation, audio data, text data, image data, device specific data (e.g., device operational data/diagnostic data), and personal information (e.g., user behavior based data including images and/or voice data of the user). In some examples, a type of data within a data packet can be determined based on packet analysis. For example, IP header analysis can be used to identify to be blocked packets. As another example, deep packet inspection techniques can be used to determine the content of a given packet. In some examples, data packets can be analyzed to determine whether the data packet is TCP (e.g., web), or UDP (e.g., video), and/or the content of the data packet can be examined to decide whether the packet should be dropped or allowed to proceed through the network flow. In some examples, deep packet inspection can touch on multiple layers of the open systems interconnection (OSI) model, going beyond simplistic access control lists embedded in routers.

Accordingly, for example, the dynamic data security platform can distinguish data packets as between type(s) of data contained therein, and selectively block data packets. That is, for example, if a data packet includes data of a to-be-blocked type, the data packet is blocked from transmission to an external network (e.g., the network 110). As another example, if a data packet does not include data of a to-be-blocked type, the data packet is transmitted to the external network (e.g., the network 110). As another example, if a data packet is received from an external network (e.g., an inbound data packet), and includes data of a to-be-blocked type, the data packet is blocked from transmission to the IoT device within the IoT system. As another example, if an inbound data packet does not include data of a to-be-blocked type, the data packet is transmitted to the IoT device within the IoT system.

In some implementations, blocked data can be dropped completely or stored privately for access by only authorized users (e.g., the owner of the IoT device). For example, the blocked data can be stored privately in a user account on a cloud server. The user account can be secured by a multi-factor authentication process, biometric key, or a combination thereof.

In some implementations, blocking of data can be based on combinations of IoT device, destination, and/or data type. For example, a security/privacy measure can indicate that data of a particular type (e.g., audio data) is to-be-blocked to, and/or from a particular (uniquely identified) IoT device. If data of the particular type (e.g., audio data) is determined to be within a data packet from, for example, the particular IoT device, the data packet is blocked from transmission to an external network. If data of another type (e.g., image data) is determined to be within a data packet from, for example, the particular IoT device, the data packet is not blocked from transmission to an external network. In some implementations, communications between two different IoT devices can be blocked. In some implementations, communications between two different IoT devices can be blocked or permitted based on user preferences. That is, a user can select whether or not different IoT devices are permitted to communicate with each other. In some implementations, the user can also select (via the user preferences) under which set of conditions (e.g. time of day, data transmission type—such as metadata v actual UDP of a video feed) different IoT devices are permitted to communicate with each other. In some implementations, the user can set a "whitelist" of IoT devices that are permitted to communicate with each other, a "blacklist" of IoT devices that are not permitted to communication with each other, or both.

Figure 2A:
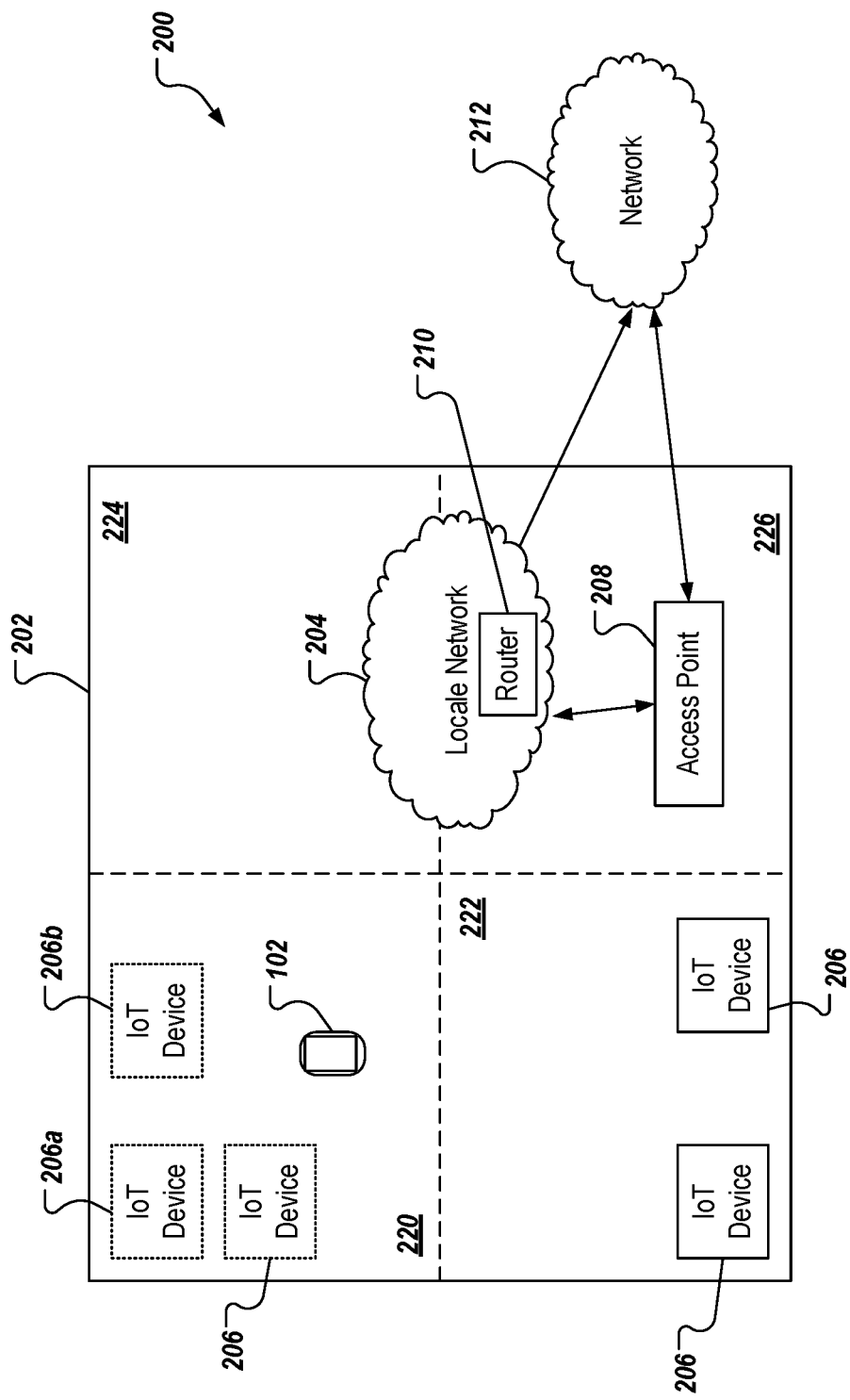
FIGS. 2A and 2B depict example use cases in accordance with implementations of the present disclosure.
Figure 2B:
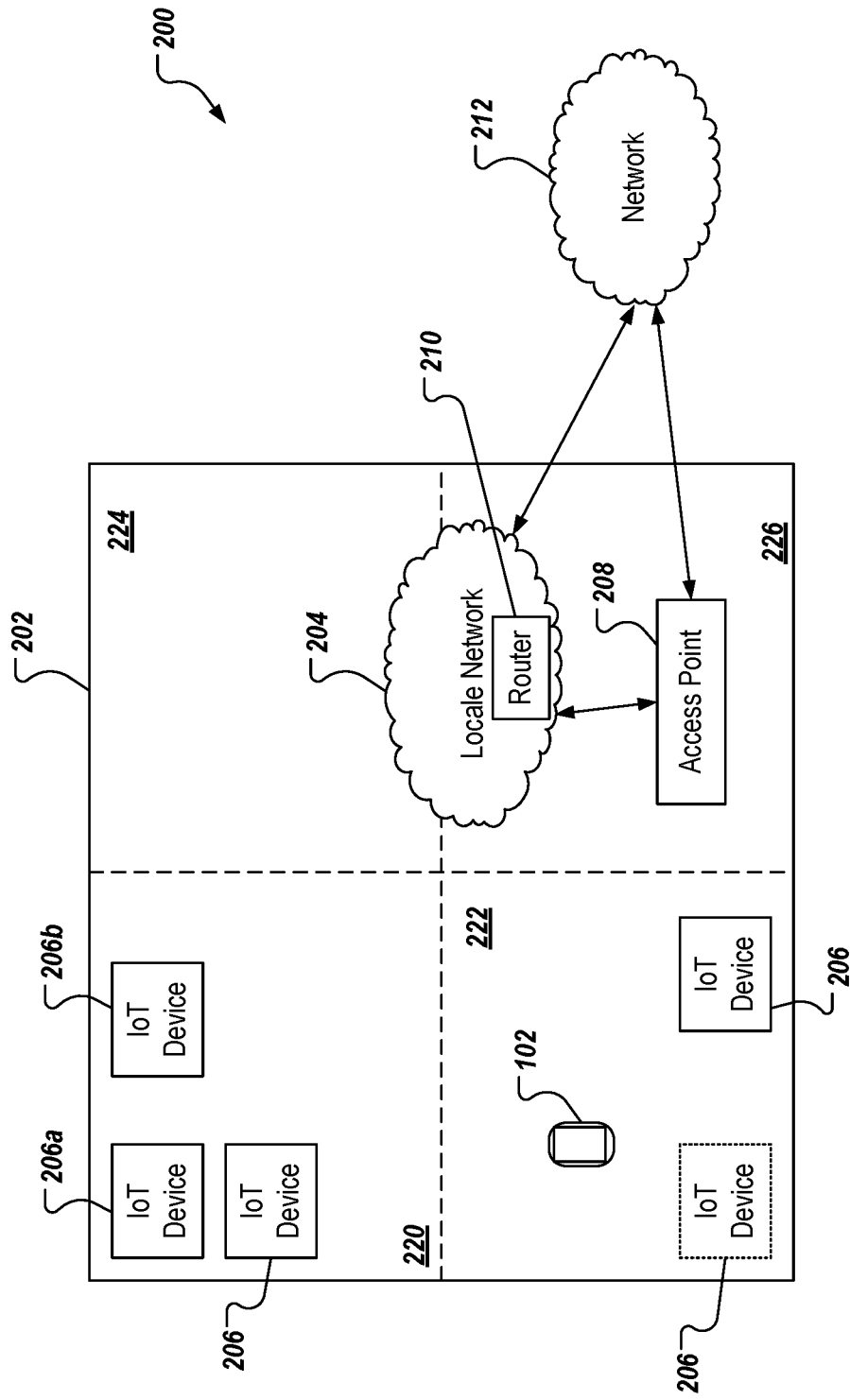

FIGS. 2A and 2B depict example use cases in accordance with implementations of the present disclosure. The example use cases include a local system 200. In accordance with the example context, the local system 200 is representative of a locale 202 of a user, such as a residence. In the depicted example, an IoT system is provided, and includes a locale network 204, IoT devices 206, an access point 208, and a router 210. The local system 200 is in communication with a network 212 (e.g., the network 110 of FIG. 1). In the depicted example, the locale 202 includes multiple areas 220, 222, 224, 226. Example areas include, without limitation, rooms (e.g., kitchen, living room, dining room, home office), garages, exterior locations (e.g., pool, backyard, courtyard), external devices (e.g., automobiles, drones, bicycles, yard equipment (tractors, mowers)).

In some implementations, one or more of the IoT devices 206 communicate with the network 212 through the router 210. For example, the router 210 can be provided as an Internet router that enables devices, such as the IoT devices 206 to transmit and receive data through the network 212. For example, an IoT device 206a can include a device associated with a voice-enabled assistant (e.g., an Echo for Alexa provided by Amazon, Inc.). In some examples, the IoT device 206a provides speech data responsive to the user's voice (e.g., "Alexa, what is the weather like today?"), and transmits at least a portion of the speech data to a back-end system through the router 210, and the network 212. In some examples, the back-end system processes the speech data, and provides a response to the IoT device 206a through the network 212, and the router 210. The IoT device 206a can convey the response to the user (e.g., "The weather will be sunny with a high of 75 degrees F.").

In some implementations, one or more of the IoT devices 206 communicate with the network 212 through the access point 208, and the router 210. For example, an IoT device 206b can include a camera associated with a home security system (e.g., an Arlo security camera provided by NETGEAR, Inc.). In some examples, the IoT device 206b provides video data, and/or audio data responsive to monitored activity, and transmits at least a portion of the video data, and/or audio data to a back-end system through the access point 208, the router 210, and the network 212. In some examples, the back-end system can process the video data, and/or audio data to provide one or more functions. For example, the back-end system can transmit an alert to the device 102 over the network 212 to inform the user of monitored activity.

In accordance with implementations of the present disclosure, software providing at least a portion of functionality of the dynamic data security platform can be installed on the access point 208, and/or on the router 210. In some implementations, the access point 208, and/or the router 210 selectively block transmission of data packets based on occurrence(s) of one or more scenarios, and one or more security/privacy measures defined for respective scenarios.

In some implementations, communications of the IoT devices 206 to the back-end system are passed through a security system. For example, the communications of the IoT devices 206 can be passed through security software such as a firewall or proxies. In some examples, the communications of the IoT devices 206 are routed through a cloud-based security system. For example, a user may establish a security account at a cloud-based security system. The communications from the user's IoT devices 206 are routed through the cloud-based security system (e.g., similar to a proxy). The cloud-based security system can selectively block transmission of data packets based on occurrence(s) of one or more scenarios, and one or more security/privacy measures defined for respective scenarios. In some examples, the cloud-based security system can track communications between the IoT devices 206 and back-end system(s).

In some implementations, a user uses the device 102 to define the one or more scenarios, and one or more security/privacy measures. By way of non-limiting example, the user can use the device 102 to define a home office scenario, which occurs when the device 102 is located within a home office. For example, the area 220 can include a home office of the user. In some examples, the user can use the device 102 to define a security/privacy measure for the home office scenario. An example security/privacy measure can include prohibiting data to be transferred from any IoT device 206 located within the area 220. As another non-limiting example, the user can use the device 102 to define a home work scenario, which occurs when the device 102 is located within one of the areas 222, 224, 226 during user-defined hours (e.g., 9 AM-5 PM) on particular days of the week (e.g., M-F). In some examples, the user can use the device 102 to define a security/privacy measure for the home work scenario. An example security/privacy measure can include prohibiting data to be transferred from a particular IoT device 206 located within the area 222. Another example security/privacy measure can include the ability to shut off/turn on any IoT device 206 device in the according to particular user preferences. For example, a particular IoT device 206 can be shut off/turned on when the user is present within/absent from one of the areas 222, 224, 226.

With particular reference to FIG. 2A, the device 102 is located within the area 220. For example, the unique authenticator of the device 102 can be used to identify the device 102, and determine that the device 102 is located within the area 220. In response, it can be determined that the home office scenario is occurring. Consequently, the corresponding security/privacy measure can be implemented to prohibit data transfer to/from any IoT device 206, 206a, 206b within the area 220.

With particular reference to FIG. 2B, the device 102 is located within the area 222. For example, the unique authenticator of the device 102 can be used to identify the device 102, and determine that the device 102 is located within the area 222. It can also be determined that a current time is between 9 AM and 5 PM, and it is a weekday. In response, it can be determined that the home work scenario is occurring. Consequently, the corresponding security/privacy measure can be implemented to prohibit data transfer to/from a particular IoT device 206 (e.g., a voice-based assistant) within the area 222, while data transfer to/from another IoT device 206 (e.g., camera) within the area 222 is allowed.

Implementations of the present disclosure can also be realized in scenarios, in which the user is traveling, and temporarily residing in a location. Example locations can include, without limitation, short-term rentals (e.g., AirBnB, vacation rentals), and hotels that may have IoT systems installed therein. In this manner, users can maintain data security/privacy, while moving between locations.

Figure 3:
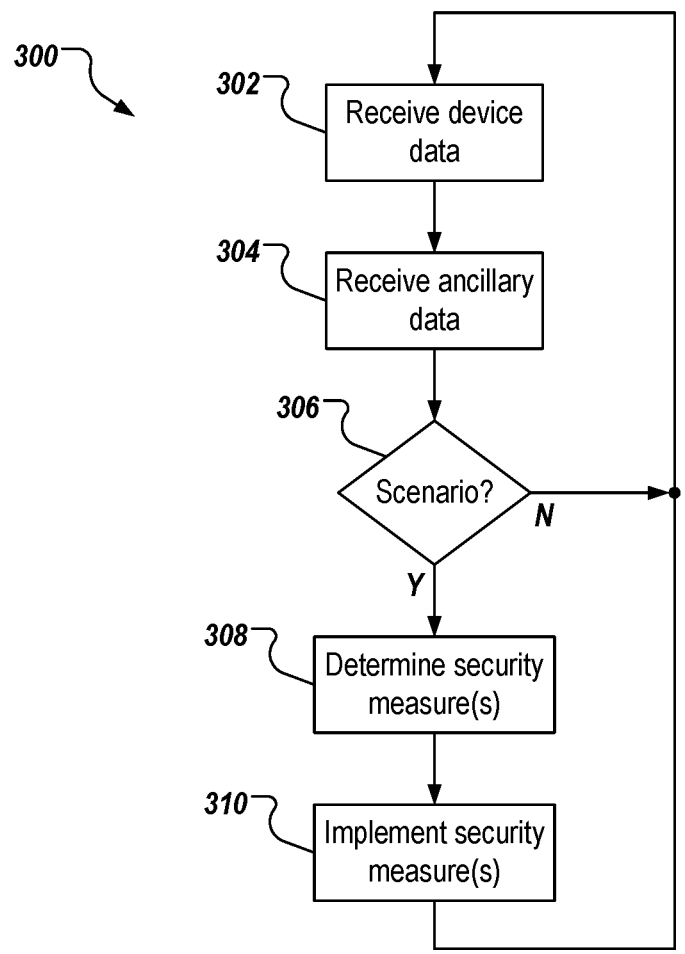
FIG. 3 depicts an example process that can be executed in accordance with implementations of the present disclosure.

FIG. 3 depicts an example process 300 in accordance with implementations of the present disclosure. The example process 300 can be executed by one or more computer-executable programs. In some examples, the example process 300 can be executed by one or more gateways of an IoT system (e.g., a router, an access point).

Device data is received (302). For example, a gateway (e.g., the access point 208, the router 210 of FIGS. 2A and 2B) receives device data associated with a device (e.g., the device 102). In some examples, the device data is received when the device connects to a network (e.g., the locale network 204). In some examples, the device data includes a unique authenticator of the device (e.g., the unique identifier including two or more of the location of the device, a timestamp, a service set identifier (SSID) of a network the IoT system uses to communicate, and an application identifier). In some examples, the device data includes a location of the device within an IoT system. Ancillary data is received (304). For example, the gateway (e.g., the access point 208, the router 210 of FIGS. 2A and 2B) receives the ancillary data. Example ancillary data includes, but is not limited to, time data, and date data. In some examples, the ancillary data is received as network data.

It is determined whether a scenario is occurring (306). For example, the gateway processes the device data, and the ancillary data in view of one or more user-defined scenarios to determine whether a scenario is occurring. In some examples, and as described herein, each scenario includes one or more criteria, and the data is used to populate the criteria. If all criteria of a scenario are met, it is determined that the scenario is occurring. If it is determined that a scenario is not occurring, the example process loops back. If it is determined that a scenario is occurring, one or more security/privacy measures are determined (308). For example, the gateway can determine the one or more security/privacy measures. As described herein, each scenario can be associated with one or more security/privacy measures to selectively inhibit data transfer to/from the IoT system. The one or more security/privacy measures are implemented (310), and the example process 300 loops back. For example, the gateway can implement the security/ privacy measure(s) to selectively drop data packets to/from one or more IoT devices within the IoT system.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device such as, without limitation, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices (e.g., EPROM, EEPROM), and flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method performed by a network router, the method comprising:
   receiving, by the network router, location data representative of a location of a mobile device of a user;
   receiving, by the network router and from at least one Internet-of-Things (IoT) device, a data transfer directed to an external network, wherein the network router serves as a gateway for a local area network on which the at least one IoT device operates within an IoT system, and wherein the location data indicates that the mobile device is co-located with the at least one IoT device;
   determining, by the network router, that a scenario is occurring within the IoT system at least partially based on the location data, wherein determining that the scenario is occurring within the IoT system comprises determining that the data transfer has been received within a predefined time period for limiting outgoing transmissions from IoT devices; and
   in response to determining that the scenario is occurring, implementing, by the network router, a security/privacy measure to prohibit transmission of at least a portion of the data transfer from the at least one IoT device of the IoT system outside of the local area network to the external network.

2. The method of claim 1, wherein occurrence of the scenario is further determined at least partially based on a unique authenticator of the mobile device.

3. The method of claim 2, wherein the unique authenticator comprises one of a multi-factor authentication or a device registration.

4. The method of claim 2, wherein the unique authenticator comprises two or more of the location of the device, a timestamp, a service set identifier (SSID) of a network the IoT system uses to communicate, and an application identifier.

5. The method of claim 1, wherein prohibiting at least a portion of data transfer from at least one IoT device comprises receiving or sending a data packet, determining that the data packet is associated with the at least one IoT device, and preventing transfer of the data packet with an external network.

6. The method of claim 5, wherein determining that the data packet is associated with the at least one IoT device comprises determining that the data packet is associated with a unique identifier, the unique identifier being assigned to the at least one IoT device.

7. The method of claim 1, wherein a gatekeeper of the IoT system implements the security/privacy measure.

8. The method of claim 7, wherein the gatekeeper comprises one or more of a router, a cloud server, a proxy, and an access point.

9. The method of claim 1, wherein implementing the security/privacy measure comprises blocking transmission of the data transfer to the external network, and storing the data transfer in a data store that permits access only by authorized users.

10. The method of claim 1, wherein implementing the security/privacy measure comprises:
    identifying an identity of the at least one IoT device and a type of data in the data transfer;
    determining that an identity of the IoT device and a type of data in the data transfer are designated by the security/privacy measure to be blocked during the scenario; and in response, prohibiting the portion of the data transfer from the at least one IoT device to the external network.

11. A system comprising:
a network router configured to serve as a gateway for a local area network on which at least one Internet-of-Things (IoT) device operates within an IoT system, the network router comprising:
at least one processor; and
a memory communicatively coupled to the at least one processor, the memory storing instructions which, when executed, cause the at least one processor to perform operations comprising:
receiving location data representative of a location of a mobile device of a user, wherein the location data indicates that the mobile device is co-located with the at least one IoT device;
receiving, from the at least one IoT device, a data transfer to an external network;
determining that a scenario is occurring within the IoT system at least partially based on the location data, wherein determining that the scenario is occurring within the IoT system comprises determining that the data transfer has been received within a predefined time period for limiting outgoing transmissions from IoT devices; and
in response to determining that the scenario is occurring, implementing a security/privacy measure to prohibit transmission of at least a portion of the data transfer from the at least one IoT device of the IoT system outside of the local area network to the external network.

12. The system of claim 11, wherein occurrence of the scenario is further determined at least partially based on a unique authenticator of the mobile device.

13. The system of claim 12, wherein the unique authenticator comprises one of a multi-factor authentication or a device registration.

14. The system of claim 12, wherein the unique authenticator comprises two or more of the location of the device, a timestamp, a service set identifier (SSID) of a network the IoT system uses to communicate, and an application identifier.

15. The system of claim 11, wherein prohibiting at least a portion of data transfer from at least one IoT device comprises receiving or sending a data packet, determining that the data packet is associated with the at least one IoT device, and preventing transfer of the data packet with an external network.

16. The system of claim 15, wherein determining that the data packet is associated with the at least one IoT device comprises determining that the data packet is associated with a unique identifier, the unique identifier being assigned to the at least one IoT device.

17. One or more non-transitory computer-readable storage media storing instructions which, when executed, cause at least one processor of a network router to perform operations comprising:
receiving location data representative of a location of a mobile device of a user;
receiving, from at least one Internet-of-Things (IoT) device, a data transfer to an external network, wherein the network router serves as a gateway for a local area network on which the at least one IoT device operates within an IoT system, and wherein the location data indicates that the mobile device is co-located with the at least one IoT device;
determining that a scenario is occurring within the IoT system at least partially based on the location data, wherein determining that the scenario is occurring within the IoT system comprises determining that the data transfer has been received within a predefined time period for limiting outgoing transmissions from IoT devices; and
in response to determining that the scenario is occurring, implementing a security/privacy measure to prohibit transmission of at least a portion of the data transfer from the at least one IoT device of the IoT system outside of the local area network to the external network.

18. The media of claim 17, wherein occurrence of the scenario is further determined at least partially based on a unique authenticator of the mobile device.

19. The media of claim 18, wherein the unique authenticator comprises one of a multi-factor authentication or a device registration.

20. The media of claim 18, wherein the unique authenticator comprises two or more of the location of the device, a timestamp, a service set identifier (SSID) of a network the IoT system uses to communicate, and an application identifier.

* * * * *